United States Patent
Boggia et al.

(10) Patent No.: US 11,172,267 B2
(45) Date of Patent: Nov. 9, 2021

(54) METHOD AND SYSTEM FOR SCHEDULING RESOURCES FOR STREAMING VIDEO SERVICES IN MOBILE COMMUNICATION NETWORKS

(71) Applicant: TELECOM ITALIA S.p.A., Milan (IT)

(72) Inventors: Gennaro Boggia, Conversano (IT); Pietro Camarda, Bari (IT); Marco Caretti, Turin (IT); Roberto Fantini, Turin (IT); Luigi Alfredo Grieco, Bari (IT); Bruno Melis, Turin (IT); Giuseppe Piro, Matera (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/469,010

(22) PCT Filed: Dec. 27, 2016

(86) PCT No.: PCT/EP2016/082709
§ 371 (c)(1),
(2) Date: Jun. 12, 2019

(87) PCT Pub. No.: WO2018/121840
PCT Pub. Date: Jul. 5, 2018

(65) Prior Publication Data
US 2020/0099990 A1    Mar. 26, 2020

(51) Int. Cl.
*H04N 21/61* (2011.01)
*H04L 12/851* (2013.01)
(Continued)

(52) U.S. Cl.
CPC ..... *H04N 21/6131* (2013.01); *H04L 47/2441* (2013.01); *H04L 65/607* (2013.01);
(Continued)

(58) Field of Classification Search
CPC .............. H04L 47/2441; H04L 65/607; H04N 21/2407; H04N 21/6131; H04W 72/1257
See application file for complete search history.

(56) References Cited

U.S. PATENT DOCUMENTS

| 7,457,973 B2 * | 11/2008 | Liu ................... | H04W 52/0216 |
| | | | 713/310 |
| 10,193,955 B2 * | 1/2019 | Leroux ................ | H04L 67/325 |
| | (Continued) | | |

OTHER PUBLICATIONS

International Search Report and Written Opinion dated Sep. 20, 2017 in PCT/EP2016/082709 filed on Dec. 27, 2016.

*Primary Examiner* — Mohamed A. Wasel
(74) *Attorney, Agent, or Firm* — Oblon, McClelland, Maier & Neustadt, L.L.P.

(57) ABSTRACT

A method of downloading video contents from a content server to a client through a base station of a wireless communication network is provided. Each video content includes a sequence of encoded video frames. The method includes having the content server send a video content in a sequence of data packets, each data packet including data corresponding to at least one portion of an encoded video frame, and having a proxy server at the base station classify each data packet according to the type of video frame it correspond to. The method also includes having a scheduler at the base station assign radio resources for the transmission of the data packets to the client based on the classification carried out by the proxy server, and transmitting the data packets to the client by exploiting the radio resource assignment carried out by the scheduler.

12 Claims, 4 Drawing Sheets

(51) Int. Cl.
*H04L 29/06* (2006.01)
*H04N 21/24* (2011.01)
*H04W 72/04* (2009.01)
*H04W 72/12* (2009.01)

(52) U.S. Cl.
CPC .... *H04N 21/2407* (2013.01); *H04W 72/0446* (2013.01); *H04W 72/1257* (2013.01)

(56) References Cited

U.S. PATENT DOCUMENTS

| | | | | |
|---|---|---|---|---|
| 2008/0123660 | A1* | 5/2008 | Sammour | H04W 72/1236 370/395.21 |
| 2008/0186909 | A1* | 8/2008 | Kim | H04W 28/14 370/328 |
| 2008/0219222 | A1* | 9/2008 | Lo | H04B 7/026 370/337 |
| 2009/0313673 | A1 | 12/2009 | Grozis | |
| 2014/0233413 | A1* | 8/2014 | Dahod | H04L 65/80 370/252 |
| 2016/0044079 | A1* | 2/2016 | Kasatani | H04N 7/147 709/219 |
| 2016/0294956 | A1* | 10/2016 | Fix | H04L 41/147 |
| 2016/0295265 | A1* | 10/2016 | Li | H04N 21/6587 |
| 2020/0099990 | A1* | 3/2020 | Boggia | H04N 21/6131 |

* cited by examiner

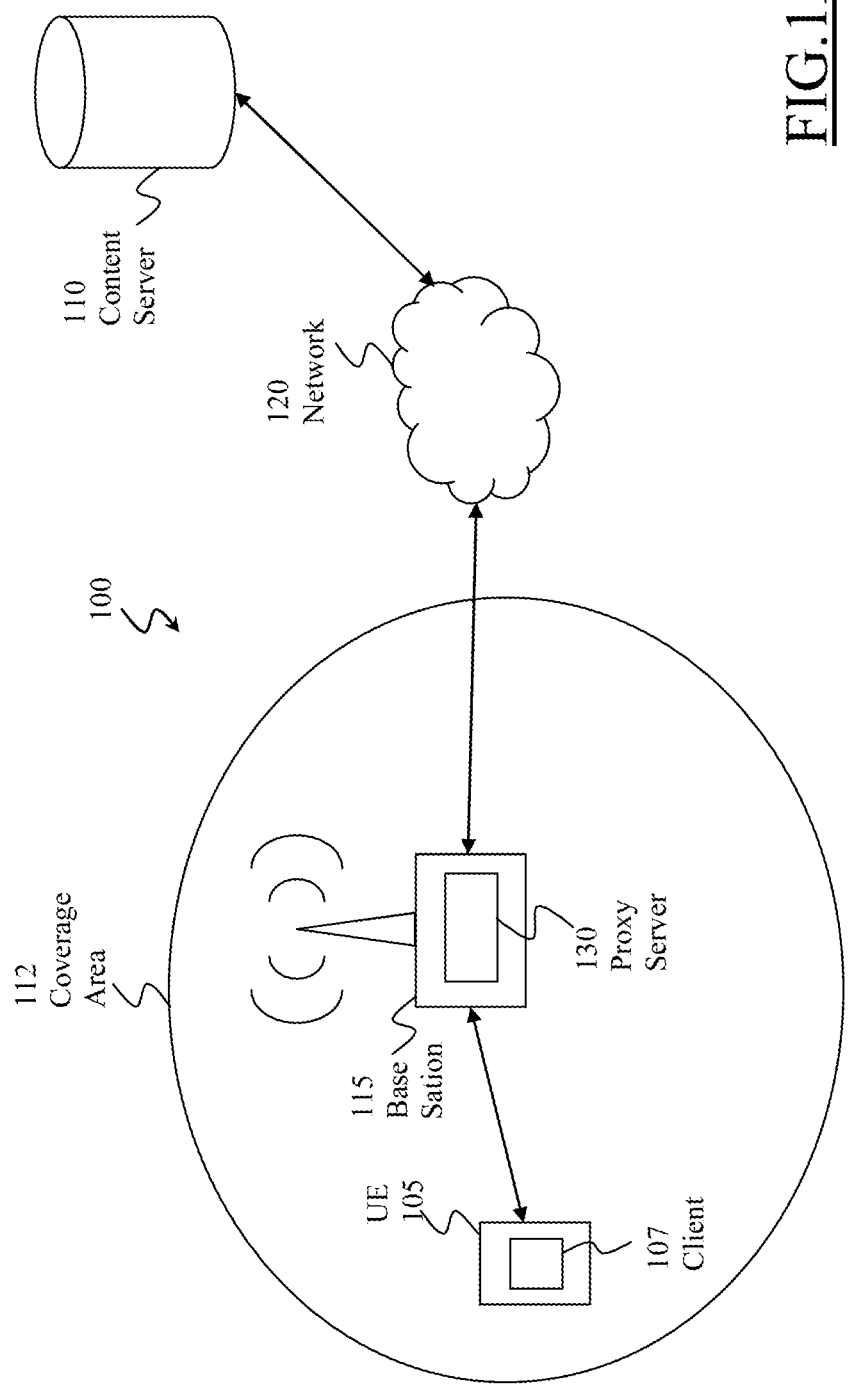

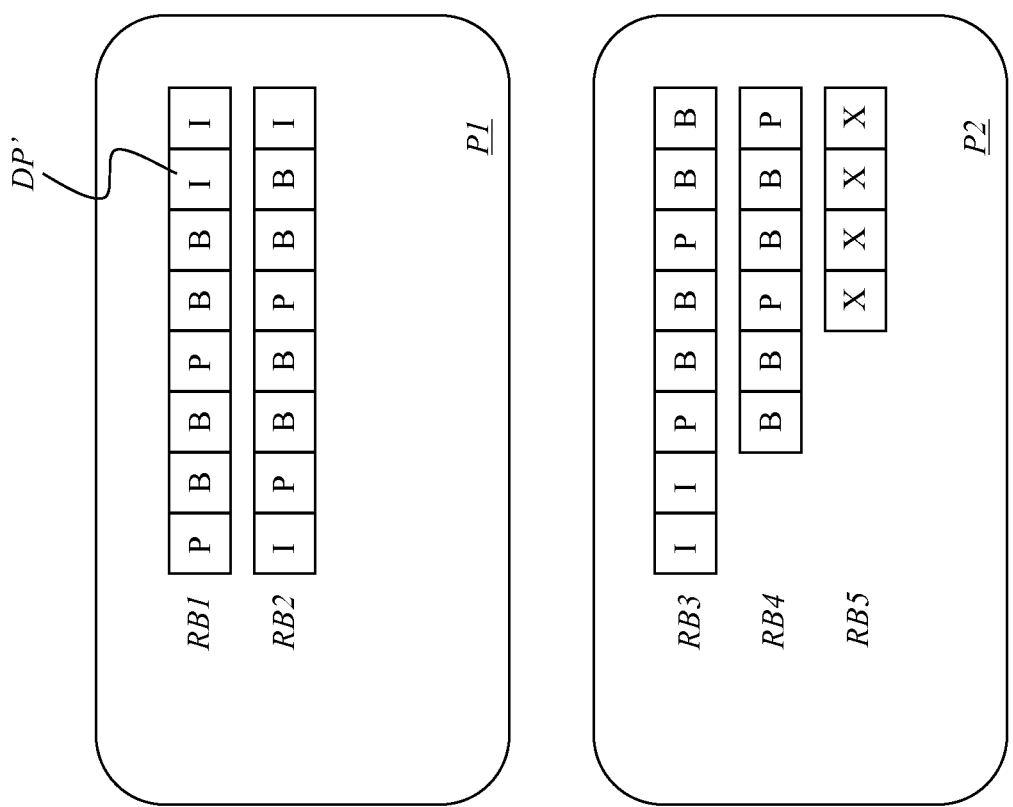

METHOD AND SYSTEM FOR SCHEDULING RESOURCES FOR STREAMING VIDEO SERVICES IN MOBILE COMMUNICATION NETWORKS

BACKGROUND OF THE INVENTION

Field of the Invention

The present invention refers to communication systems. More particularly, the present invention relates to the field of wireless or mobile telecommunication networks. Even more particularly, the present invention relates to scheduling of radio resources for streaming multimedia content in a wireless communication network.

Overview of the Related Art

Streaming services, such as video delivery, i.e., services in which a multimedia content (e.g., a multimedia file, such as a video recording or video clip) is constantly received by and presented to an end user, while being delivered by a provider of the streaming service, are already widely popular and are expected to become dominant in current and next generation wireless communication networks, particularly in cellular systems, mainly thanks to the increment in the network available bandwidth, for example allowed by both Long Term Evolution (LTE) and Long Term Evolution Advanced (LTE-A) standards for mobile telephony networks.

Unfortunately, even in large-bandwidth (i.e., broadband) wireless communication networks (such as LTE/LTE-A networks), it could be difficult to offer a satisfactory Quality of Service (QoS) level during the provision of the streaming service without adopting ad hoc optimization strategies.

In a conventional streaming service, a remote server sends a stream of packets storing at least portions of video frames to a client. Making reference to a wireless communication network, such as an LTE/LTE-A network, the client runs on a user equipment which is in communication with the remote server through a radio communication station. In this case, the packets sent by the remote server are received by the radio communication station (base station), wherein they are queued at the MAC layer and then transmitted to the client according to a packet scheduling algorithm. Among the available packet scheduling algorithms, QoS-aware packet scheduling algorithms are known, which are capable of allocating radio resources to active users by considering QoS parameters, such as maximum delay and minimum transmission rate, assigned to each active flow.

Streaming services require that the packets have to be sent to the end user (user equipment) before the expiration of a given deadline. However, in case of high traffic load, radio resources may become saturated, preventing the fulfilment of such requirement.

Moreover, as it is well known to those skilled in the art, videos to be streamed are usually encoded according to video encoding algorithms which provide for generating different types of video frames having different roles and importance in the decoding process. Therefore, in order to increase the QoS when the radio resources are scarce, packets storing at least portions of video frames should be transmitted using different levels of priority according to the type of video frame each packet of the stream corresponds to.

EP1619839 discloses a method and an apparatus for scheduling transmission of multimedia streaming services over the radio channel of wireless communication systems based on the importance or rank of the data contained in each packet transmitted by a service provider to the wireless system. A gateway between a wired and a wireless part of the system comprises snooping and marking means for reading, from each packet arriving at said gateway, an information related to the rank of the data contained in each packet and marking each data unit formed from a packet with said information. Critical condition detecting means and data unit discarding means are provided, located in a radio resource manager and arranged to cooperate with said buffer and with each other to detect the existence of critical conditions of the radio channel preventing the attainment of a given quality-of-service level and consequently to selectively drop data units from the buffer based on said marking and to cause allocation of radio resources to the remaining data units.

US 2005/0286438 discloses a method for providing cross-layer QoS functionality in a wireless network. The method includes obtaining QoS data from each layer of an application stack for a particular application. A QoS matrix is generated based on the obtained QoS data. Packet distribution for the particular application may then be prioritized based on the QoS matrix.

WO 2005/029867 discloses a system and method for adaptively changing as error protection strategy for a digital video transmission depending upon the characteristics of a transmission channel. A video classification processor located in a video encoder analyzes a video sequence and determines priority classes for video data packets based on objective criteria, and determines sequence dependent features of the video sequence, and classifies the video data packets in sub-priorities based on the sequence dependent features of the video sequence. The system can also re-classify video data packet priorities based on objective criteria using either the sequence dependent features of the video sequence or an error concealment algorithm.

Paper "*Two-level downlink scheduling for real-time multimedia services in LTE networks*" by G. Piro, L. A. Grieco, G. Boggia, R. Fortuna, P. Camarda, IEEE Transactions on Multimedia 13 (5), 1052-1065, October 2011, discloses a scheduling algorithm for the allocation of radio resources to video flows in a priority-based manner.

Paper "*Adaptive Cross-layer QoS for priority-based video streaming over wireless channel*" by Zhiling Li and Jinhe Zhou, First International Conference on Future Information Networks (ICFIN), pages 108-112, 14-17 October 2009, discloses a cross-layer approach that identifies the frame type at the base station and accordingly influences the scheduling behavior.

Paper "*CAAHR: Content aware adaptive HARQ retransmission scheme for 4G/LTE network*" by Balaaji Tirouvengadam, Rakesh Radhakrishnan and Amiya Nayak, Fourth International Conference on Ubiquitous and Future Networks (ICUFN), pages 456-461, 4-6 Jul. 2012, discloses using a label to identify the frame type at the base station to properly adapt HARQ settings.

Paper "*Opportunistic Proportional Fair Downlink Scheduling for Scalable Video Transmission over LTE Systems*" by Khan N., Martini M. G., Staehle D., Vehicular Technology Conference (VTC FALL), 2013 IEEE 78$^{th}$, pages 1-6, 2-5 Sep. 2013 discloses an opportunistic scheduling algorithm that allocates radio resources among users according to the type of frames available in the queue.

SUMMARY OF THE INVENTION

The Applicant has found that the known solutions mentioned above are not capable of efficiently scheduling resources for streaming videos in case the video to be streamed has been encoded to have different types of video frames having different importance levels in the decoding process.

The solution disclosed in EP 1619839 is not efficient since it requires that the information on the rank of a packet is communicated from the gateway to the base station with an additional header. Moreover the gateway is not able to understand the nature of the video frame itself, but it must read this information from headers that the video server must insert in the video flow.

Similarly, the solution disclosed in US 2005/0286438 requires an additional interface to communicate information to the base station.

The solution disclosed in WO 2005/029867 provides to carry out a classification at the video transmitter, and therefore the transmitting base station should be informed on the characteristics of each packet.

The solution disclosed in paper "*Two-level downlink scheduling for real-time multimedia services in LTE networks*" does not provide for different treatments for different video frame types, and therefore cannot ensure a minimum QoS to users experiencing a bad channel condition in an overloaded scenario. Also, this solution can significantly limit the amount of bandwidth assigned to other best effort applications.

The solution disclosed in paper "*Adaptive Cross-layer QoS for priority-based video streaming over wireless channel*" introduces the possibility to assign different priority levels to packets storing video contents. Specifically, a higher priority level is assigned to packets storing a video frame of type I (or a portion of it). Such a priority is taken into account only during the retransmission process handled by the ARQ mechanism: indeed, priority packets are retransmitted before the others. Unfortunately, a priority-based management of video packets handled in the context of the retransmission process cannot be enough to ensure the delivery of video frames of type I before the expiration of their deadline. Therefore, this approach is not suited for being used in scenarios with high traffic load.

The solution disclosed in paper "*CAAHR: Content aware adaptive HARQ retransmission scheme for 4G/LTE network*" focuses on the HARQ scheme and introduces the possibility to increment the maximum number of retransmissions for video frames of type I. In this case as well, video frames of type I are prioritized only during the retransmission procedure. Therefore, this solution is not suited for being used in scenarios with high traffic load.

The solution disclosed in paper "*Opportunistic Proportional Fair Downlink Scheduling for Scalable Video Transmission over LTE Systems*" focuses on the radio resource management scheme and defines an opportunistic algorithm for properly calculating the scheduling metric assigned to active flows. In LTE, during each time slot, the LTE scheduler calculates a metric for each user and for each sub channel; the metric is calculated starting from a set of parameters (such as, channel quality, quality of service parameters, average transmission rate, and so on); then, each sub channel is assigned to the user that experiences the highest metric for the considered sub channel. The solution disclosed in "*Opportunistic Proportional Fair Downlink Scheduling for Scalable Video Transmission over LTE Systems*" provides for calculating the metric by considering also the presence of important packets to transmit (like those storing video frames of type I). Therefore, transmission queues with video frames of type I may have higher metric values. However, this approach does not assign the highest priority to video frames of type I, significantly impairing the quality of service in scenario with high load.

Applicant has found that if a proxy server is provided at the base stations, which identifies the type (e.g., I, P, B) of each video frame of a received video content, classifies the data packets storing such video frames according to the frame type, and if the scheduler schedules the radio resource by taking into account such data packet classification, the problems of the prior art solutions can be efficiently overcome.

In principle, the present invention allows the scheduler at the base station to optimize the radio resource assignment by availing of information about the types of frame corresponding to the received data packets.

Since this kind of information is only available at the application layer of the base station, while the scheduler operates at the MAC sublayer of the base station, according to an embodiment of the present invention, the proxy server is configured to deliver such information from the application layer to the MAC sublayer.

An aspect of the present invention relates to a method of downloading video contents from a content server to a client through a base station of a wireless communication network. Each video content comprises a sequence of encoded video frames. The method comprises:

having the content server sending a video content in a sequence of data packets, each data packet comprising data corresponding to at least one portion of an encoded video frame;

having a proxy server at said base station classifying each data packet according to a type of video frame it corresponds to;

having a scheduler at said base station assigning radio resources for the transmission of the data packets to the client based on the classification carried out by the proxy server;

transmitting the data packets to the client by exploiting the radio resource assignment carried out by the scheduler.

According to an embodiment of the present invention, said type of video frame comprises the Intra-coded picture frame type.

According to an embodiment of the present invention, said type of video frame comprises the Predicted picture frame type.

According to an embodiment of the present invention, said type of video frame comprises the Bi-predictive picture frame type.

According to an embodiment of the present invention, said having the scheduler assigning radio resources for the transmission of the data packets to the client based on the classification carried out by the proxy server comprises prioritizing the assignment of radio resources for the transmission of data packets which have been classified as corresponding to the Intra-coded picture frame type.

According to an embodiment of the present invention, said having a proxy server at said base station classifying each data packet according to a type of video frame it corresponds to comprises the following sequence of operations:

identifying the type of video frame the data packet corresponds to, and classifying said data packet according to the identified type of video frame.

According to an embodiment of the present invention, said classifying comprises labeling such data packet with a label indicative of the identified type of video frame.

According to an embodiment of the present invention, said having a proxy server at said base station classifying each data packet according to a type of video frame it corresponds to is carried out by the proxy server at the application layer of the base station.

According to an embodiment of the present invention, the method further comprises having the proxy server delivering the classified data packets to the scheduler at the MAC layer of the base station.

According to an embodiment of the present invention, the classified data packets corresponding to a same video content are arranged in a corresponding transmission queue which is assigned to a corresponding radio bearer.

According to an embodiment of the present invention, the method further comprises having the scheduler divide radio bearers corresponding to different video contents into a first priority group and into a second priority group.

According to an embodiment of the present invention, the first priority group comprises radio bearers whose corresponding transmission queues have a corresponding head of line data packet which is classified as corresponding to the Intra-coded picture frame type.

According to an embodiment of the present invention, the second priority group comprises the remaining radio bearers.

According to an embodiment of the present invention, said having the scheduler assigning radio resources for the transmission of the data packets to the client based on the classification carried out by the proxy server comprises prioritizing the assignment of radio resources to radio bearers belonging to the first priority group.

Another aspect of the present invention relates to a system, comprising:
a wireless communication network comprising at least one base station;
a content server for transmitting video contents to a client through said base station, each video content comprising a sequence of encoded video frames, the content server being configured to send a video content in a sequence of data packets, each data packet comprising data corresponding to at least one portion of an encoded video frame.

According to an embodiment of the present invention, a proxy server is provided at said base station for classifying each data packet according to the type of video frame it corresponds to.

According to an embodiment of the present invention, a scheduler is further provided at said base station for assigning radio resources for the transmission of the data packets to the client based on the classification carried out by the proxy server, the data packets being transmitted to the client by exploiting the radio resource assignment carried out by the scheduler.

According to an embodiment of the present invention, said type of video frame comprises the Intra-coded picture frame type.

According to an embodiment of the present invention, said type of video frame comprises the Predicted picture frame type.

According to an embodiment of the present invention, said type of video frame comprises the Bi-predictive picture frame type.

According to an embodiment of the present invention, the scheduler is configured to prioritize the assignment of radio resources for the transmission of data packets which have been classified as corresponding to the Intra-coded picture frame type.

According to an embodiment of the present invention, said proxy server is further configured to carry out the following sequence of operations:
identifying the type of video frame the data packet corresponds to, and
classifying said data packet according to the identified type of video frame.

According to an embodiment of the present invention, said proxy server is further configured to label such data packet with a label indicative of the identified type of video frame.

According to an embodiment of the present invention:
the proxy server is at the application layer of the base station;
the scheduler is at the MAC layer of the base station;
the proxy server is configured to deliver the classified data packets from the application layer of the base station to the scheduler at the MAC layer of the base station.

According to an embodiment of the present invention:
the classified data packets corresponding to a same video content are arranged in a corresponding transmission queue which is assigned to a corresponding radio bearer;
the scheduler is configured to divide radio bearers corresponding to different video contents into a first priority group and into a second priority group, wherein:
the first priority group comprises radio bearers whose corresponding transmission queues have a corresponding head of line data packet which is classified as corresponding to the Intra-coded picture frame type;
the second priority group comprises the remaining radio bearers.

According to an embodiment of the present invention, the scheduler is configured to prioritize the assignment of radio resources to radio bearers belonging to the first priority group.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 1A is a principle schematic of a wireless communication network in which a user equipment connects to a content server for requesting a streaming service;

FIG. 3 illustrates an exemplary assignment of radio bearers to priority groups according to an embodiment of the present invention.

DETAILED DESCRIPTION

Figure 1B:
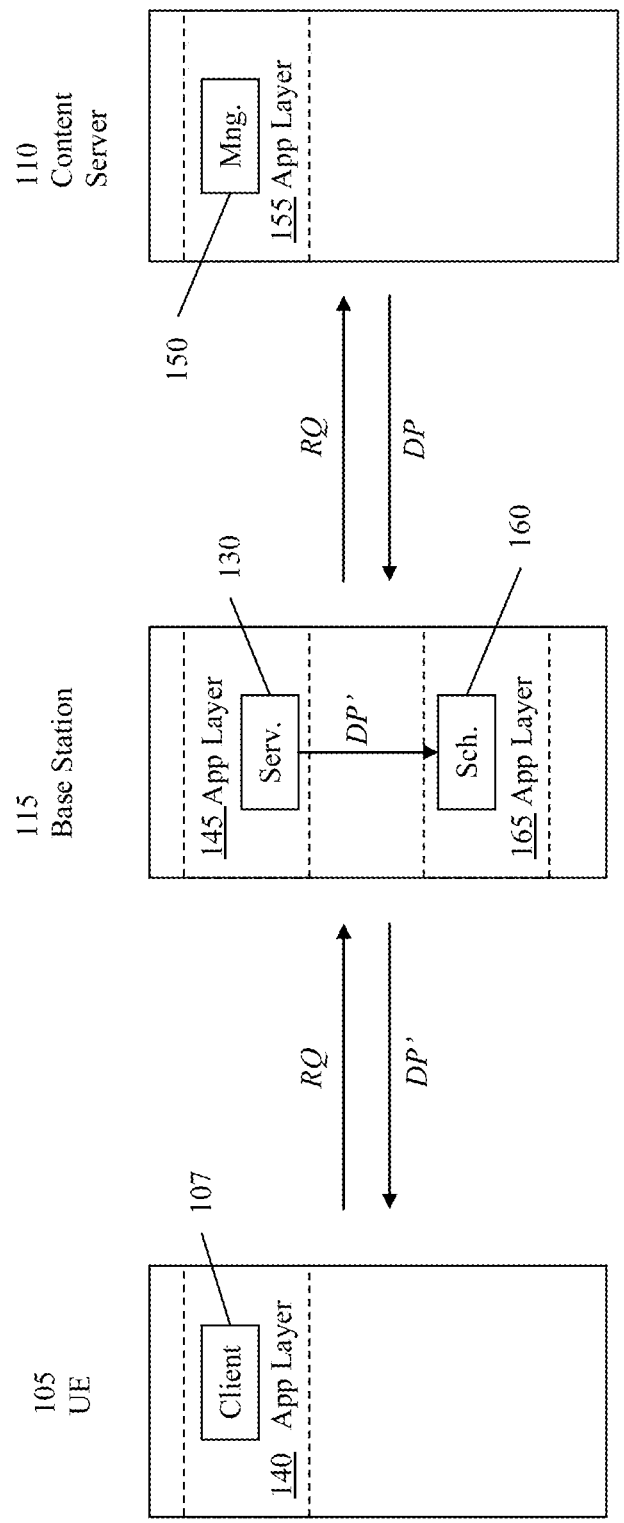
FIG. 1B is a simplified functional block schematic of OSI protocol stack layers over which an optimized radio resource assignment algorithm according to an embodiment of the present invention operates.

With reference to the drawings, FIG. 1A is a principle schematic of a (generic) wireless communication network 100 in which a user equipment 105—on which runs a client software application 107—connects to a content server 110 (e.g., a multimedia server) for requesting a streaming service.

The wireless communication network 100 allows and manages communications of user equipment (e.g., mobile telephones, smartphones, personal computers and tablets) such as the user equipment 105 on which runs the client 107 over a geographical coverage area 112 by means of one or more radio communication stations (hereinafter, simply referred to as "base stations"), such as the base station 115. For example, the wireless communication network 100 is a 3GPP Long Term Evolution (LTE)/LTE Advanced (LTE-A) mobile telephony network comprising a plurality of base stations 115 (evolved Node B) adapted to manage communications (i.e., transmission and/or reception of information, such as binary data packets) within the geographical coverage area 112.

The content server 110 is a remote entity that is connected to the wireless communication network 100 by means of an external communication network 120, for example Internet.

The content server 110 is configured to provide streaming services of video content VC comprising sequence of video frames to the client 107 running on one or more user equipment, such as the user equipment 105, through the base station 115. In other words, the content server 110 is adapted to deliver a (stored or temporarily stored) video content VC comprising a sequence of video frames to the client 107 running on the user equipment 105 in such a way that the video content VC is directly enjoyable by means of the client 107 substantially from the start of the video content VC delivery.

As it is well known to those skilled in the art, the video frames of a video content VC to be streamed are usually coded by means of a video encoding algorithm. Encoding algorithms provide for encoding a video content VC by generating a sequence of encoded video frames arranged in so-called Group Of Pictures (GOP), each one comprising a corresponding subset of encoded video frames arranged according to a respective ordered sequence. The encoded video frames included in a GOP may be classified according to different frame categories, or types, performing different purposes and having different roles and importance within the GOP decoding procedure to be carried out for obtaining back the original video frames of the video content VC.

For example, the three following frame types are widely used:

I-frame (also referred to as "Intra-coded picture"). An encoded video frame of this type is a video frame that is encoded independently of all other video frames of the same GOP.

P-frame (also referred to as "Predicted picture"). An encoded video frame of this type is such to comprise only information about the differences between the video frame itself and the previous video frame.

B-frame (also referred to as "Bi-predictive picture"). An encoded video frame of this type is such to comprise only information about the differences between the video frame itself and both the preceding and following video frames.

Each GOP begins (in decoding order) with an I-frame. I-frames are encoded with intra-frame algorithms at low compression levels, while P-frames and B-frames are encoded with inter-frame algorithms at higher compression levels (B-frame corresponding to the highest compression level).

The encoded video frames of the video content VC are delivered by the content server 110 to the client 107 running on the user equipment 105 through the base station 115 in form of data packets DP, each one comprising data corresponding to at least a portion of an encoded video frame.

Within a GOP, I-frames are used to encode and decode the P-frames and the B-frames. Therefore, if during the streaming of a video content VC a data packet DP comprising data corresponding to a portion of a I-frame did not reach the client 107, the entire GOP to which such I-frame belongs to cannot be decoded.

In order to avoid (or at least reduce) the occurrence of this drawback, data packets DP corresponding to I-frames (or portions thereof) should be managed with higher priority compared to data packets DP corresponding to P-frames and B-frames (or portions thereof) during the transmission process, especially during the radio resource assignment.

In other words, when radio resources are assigned for the transmission of data packets DP to the user equipment 105, such radio resource assignment should prioritize the assignment of radio resources to the data packets DP corresponding to I-frames (or portions thereof).

However, while the radio resource assignment is carried out by a scheduler of the base station 115 which operates at the data link layer (layer 2 of the Open Systems Interconnection (OSI) model)—and particularly at the Media Access Control (MAC) sublayer thereof—, the knowledge of the type of frame corresponding to a data packet DP is instead usually available only at the application layer (layer 7 of the OSI model). Therefore, according to the known solutions, the scheduler cannot benefit from the knowledge of the type of frame for prioritizing the assignment of radio resources to the data packets DP corresponding to I-frames, since this information is provided at a different layer of the OSI model.

In principle, the present invention overcomes this drawback by allowing the scheduler at the base station to optimize the radio resource assignment by availing of information about the types of frame corresponding to the data packets DP.

According to an embodiment of the present invention, this is carried out by providing a proxy server at the application layer of the base station 115 which is configured to classify, e.g., label, the data packets DP received from the content server 110 according to the type of frames they correspond to, and provide such classified, e.g., labeled, data packets DP to the scheduler at the MAC sublayer, so that the scheduler may optimize the radio resource assignment by exploiting information from such data packet classification, e.g., labeling.

FIG. 1B is a simplified functional block schematic of OSI protocol stack layers over which an optimized radio resource assignment algorithm according to an embodiment of the present invention operates.

The client 107, which is an entity provided at the application layer of the user equipment 105 (application layer of the user equipment 105 is identified in figure with reference 140), is configured to generate a request RQ of a specific video content VC to be sent to the content server 110 through the base station 115.

According to an embodiment of the invention, a proxy server 130 application is provided at the application layer of the base station 115 (application layer of the base station 105 is identified in figure with reference 145). The proxy server 130 is configured to forward the request RQ received from the user equipment 105 to the content server 110 without applying any modification.

A content manager 150 application is provided at the application layer of the content server 110 (application layer of the content server 110 is identified in figure with reference 155), which is configured to select the video content VC specified in the request RQ to be sent to the user equipment 105—via the base station 115—in form of a stream of data packets DP, wherein each data packet DP comprises data corresponding to at least a portion of an encoded video frame of the selected video content VC.

According to an embodiment of the present invention, when the stream of data packets DP delivered by the content server 110 reaches the base station 115, such stream of data packets DP is processed by the proxy server 130 at the application layer 145 so that each data packet DP of the stream is:

inspected in order to identify the type of frame the data packet DP corresponds to, and classified based on the type of frame the data packet DP corresponds to.

For example, according to an embodiment of the present invention, such inspection may provide for extracting from the data packet DP (e.g., from the information header of the data packet DP), information related to the encoding algorithm used for encoding the content of the data packet DP.

Moreover, according to an embodiment of the present invention, such classification may provide that each data packet DP is labeled with a label indicative of the type of frame the data packet DP corresponds to.

Hereinafter, a classified, e.g., labeled, data packet will be identified as DP'.

According to an exemplary embodiment of the present invention, the video frames of the video content VC are encoded using a video codec based on a compression standard, such as the H264 standard, and transmitted using a real time streaming protocol, such as the Real-Time Protocol (RTP). According to the H264 standard, the video frames of the video content VC are encoded in H264 packets, each one storing a corresponding compressed video frame and parameters useful for decoding the data packet. According to the H264 standard, the first byte of a H264 packet (also referred to as "header") is used to indicate the type of frame which is stored in such H264 packet. Then, according to the RTP each H264 packet is encapsulated in a data packet DP. According to this exemplary embodiment, as soon as a new data packet DP is received, the proxy server 130 is configured to carry out the following sequence of operations:

extracting the H264 packet from a data packet DP, processing the H264 packet for identifying the type of frame stored therein by extracting information related to the encoding algorithm used for encoding such packet, e.g., by reading the header of the H264 packet, and classifying the data packet according to the identified type of frame to obtain a classified data packet DP', for example by assigning thereto a label describing the type of frame stored in the H264 packet.

Naturally, the concepts of the present invention directly apply to cases in which the video frames of the video content VC are encoded using a different video codec based on a different compression standard, such as for example the H263 or the H265 standard.

Making reference to the three exemplary frame types described above, each classified, e.g., labeled, data packet DP' may be classified, e.g., labeled, as:

corresponding to (a portion of) a I-frame,
corresponding to (a portion of) a B-frame, or
corresponding to (a portion of) a P-frame.

Classified data packets DP' corresponding to a single video content VC are generally stored at the Radio Link Control (RLC) of the protocol stack running at the base station 115 within a dedicate queue of data packets. As it is well known to those skilled in the art, the first data packet of the queue, i.e., the data packet which will be served (i.e., transmitted) first in the queue is referred to as "head of line packet". According to the 3GPP specification, this queue is generally assigned to a so called "radio bearer" RB, which is a logic link between the base station 115 and the user equipment 105. It is underlined that a radio bearer RB can store, in addition to data packets DP' belonging to a video content VC, also packets pertaining to other kinds of data, such as for example best effort data.

According to an embodiment of the present invention, the proxy server 130 is configured to deliver the classified, e.g., labeled, data packets DP' to a scheduler 160 at the MAC sublayer of the base station 115 (MAC layer of the base station 115 is identified in figure with reference 165).

Figure 2:
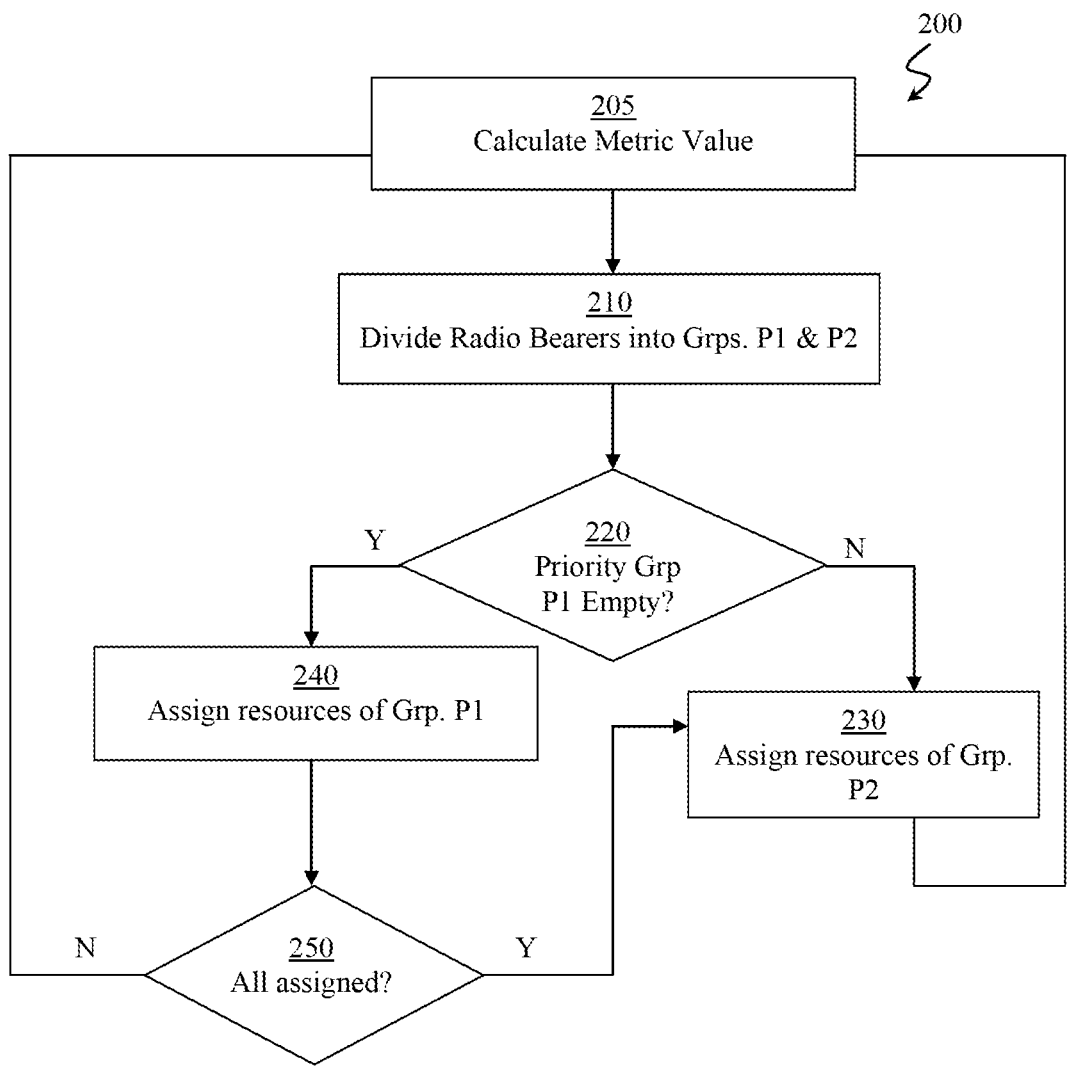
FIG. 2 is a flow chart illustrating in terms of functional blocks the main operations carried out by a scheduler for assigning radio resources to radio bearers for the transmission to a client according to an embodiment of the present invention.

FIG. 2 is a flow chart 200 illustrating in terms of functional blocks the main operations carried out by the scheduler 160 for assigning radio resources to radio bearers RB for the transmission to the client 107 according to an embodiment of the present invention.

According to an embodiment of the present invention, the scheduler 160 is configured to implement a scheduling algorithm that prioritizes the assignment of radio resources (for the transmission to the client 107) to the classified, e.g., labeled, data packets DP' corresponding to I-frames.

According to the 3GPP specifications, the scheduler 160 is configured to assign radio resource into the time/frequency domain. In particular, in the time domain radio resources are distributed every Transmission Time Interval (TTI), each one lasting 1 ms. In the frequency domain, instead, the total bandwidth is divided in sub-channels of 180 kHz. A time/frequency radio resource spanning over one TTI in the time domain and over one sub-channel in the frequency domain corresponds to the smallest radio resource unit that can be assigned to the user equipment 105 for data transmission.

The operations carried out by the scheduler 160 and illustrated in terms of functional blocks in the flow chart of FIG. 2 are reiterated every TTI. The radio resource assignment carried out by the scheduler 160 is then exploited for transmitting the data packets to the client 107.

According to an exemplary but not limitative embodiment of the present invention, the scheduler 160 is configured to assign radio resources to radio bearers RB according to a metric-based algorithm. For example, a metric value $m_{ij}$ is calculated for each i-th radio bearer RB and for each j-th sub-channel (block 205). For example, the metric value $m_{ij}$ may be calculated as a function of a set of parameters, such as channel quality, quality of service requirements, average transmission rate, and so on). The way said metric value $m_{ij}$ is calculated is out of scope of this invention. Any solution already proposed in the literature (like Proportional Fair, Maximum Throughput, Exp rule, Log, rule, and so on) can be adopted in this context.

According to an embodiment of the present invention, the scheduler 160 is configured to divide radio bearers RB into a first priority group P1 and a second priority group P2 (block 210), wherein:

The first priority group P1 comprises radio bearers RB whose queues have the corresponding head of line data packet DP' which is classified, e.g., labeled, as corresponding to an I-frame.

The second priority group P2 comprises all the remaining radio bearers.

An exemplary assignment of radio bearers to the priority groups P1 and P2 according to an embodiment is illustrated in FIG. 3. In the example illustrated in FIG. 3, the base station 115 is configured to concurrently manage five radio bearers RB1, RB2, RB3, RB4, RB5. FIG. 3 shows the queues of such five radio bearers RB1, RB2, RB3, RB4, RB5, in which the head of line packet of each queue is located at the rightmost position of the respective queue. In the considered example, the radio bearers RB1 and RB2 have been included in the first priority group P1, since the head of line data packets DP' of their queues are both classified, e.g., labeled, as corresponding to an I-frame. Conversely, the remaining radio bearers RB3, RB4 and RB5 have been included in the second priority group P2, since the head of line data packets of their queues are not classified, e.g., labeled, as corresponding to an I-frame. The radio bearer RB5 corresponds to a queue whose data packets have not been classified, for example because corresponding to a stream of "best effort" packets.

At this point, a check is made (block 220) to verify whether the first priority group P1 is empty or not.

If the first priority group P1 is empty (exit branch N of block 220), meaning that none of the currently active radio bearers RB has the corresponding queue having the head of line data packet DP' which is classified, e.g., labeled, as corresponding to an I-frame, the scheduler 160 assigns radio resources, e.g., sub-channels, to the radio bearers RB belonging to the second priority group P2 according to their metric values mij (block 230). At the beginning of the next TTI, the process is reiterated and new metric values mij are calculated for the currently active radio bearers RB (return to block 205).

If the first priority group P1 is not empty (exit branch Y of block 220), meaning that at least one of the currently active radio bearers RB has the corresponding queue having the head of line data packet DP' which is classified, e.g., labeled, as corresponding to an I-frame, the scheduler 160 assigns radio resources, e.g., sub-channels, to the radio bearers RB belonging to the first priority group P1 according to their metric values mij (block 240). Once all the radio bearers RB belonging to the first priority group P1 have been served, a further check is made (block 250) to verify whether in this TTI there are still available radio resources (e.g., sub-channels) or not.

In case all the radio resources have been assigned for the transmission of radio bearers RB belonging to the first priority group P1 (exit branch N of block 250), it means that the radio bearers RB belonging to the second priority group P2 cannot be served during the current TTI. At the beginning of the next TTI, the process is reiterated and new metric values mij are calculated for the currently active radio bearers RB (return to block 205).

In case some radio resources are still available after the assignment thereof to the radio bearers RB belonging to the first priority group P1 (exit branch Y of block 250), the scheduler 160 assigns such remaining radio resources (e.g., sub-channels) to the radio bearers RB belonging to the second priority group P2 according to their metric values mij (block 230). At the beginning of the next TTI, the process is reiterated and new metric values mij are calculated for the currently active radio bearers RB (return to block 205).

In this way, according to embodiments of the present invention, the radio resource assignment is optimized by always prioritizing the radio bearers RB whose queues have the head of line data packets DP' which are classified, e.g., labeled, as corresponding to I-frames.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the solution according to an embodiment of the invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the cellular network has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

Moreover, although explicit reference has been made to a cellular network based on the LTE/LTE-Advanced standard, it should be understood that it is not in the intentions of the Applicant to be limited to the implementation of any particular wireless communication system architecture or protocol (e.g., Wi-Fi). In this respect, it is also possible to provide that, with suitable simple modifications, the proposed solution may be applied also to other cellular networks, such as the view forthcoming 5G (and beyond) cellular networks.

The invention claimed is:

1. A method of downloading video contents from a content server to a client through a base station of a wireless communication network, each video content comprising a sequence of encoded video frames, the method comprising:

having the content server send a video content in a sequence of data packets, each data packet comprising data corresponding to at least one portion of an encoded video frame;

having a proxy server at said base station classify and label each data packet according to a type of video frame corresponding thereto, the proxy server extracting from each data packet information related to an encoding algorithm of the video frame corresponding thereto in order to determine the type of the video frame;

having a scheduler at said base station assign radio resources for the transmission of the data packets to the client based on labels added to the data packets by the proxy server; and transmitting the data packets to the client by exploiting the radio resource assignment carried out by the scheduler.

2. The method of claim 1, wherein:
said type of video frame comprises: Intra-coded picture frame type, Predicted picture frame type, and Bi-predictive picture frame type, and
said having the scheduler assign radio resources for the transmission of the data packets to the client based on the labels carried out by the proxy server comprises prioritizing the assignment of radio resources for the transmission of data packets which have been classified as corresponding to the Intra-coded picture frame type.

3. The method of claim 2, wherein said having a proxy server at said base station classify each data packet according to the type of video frame corresponding thereto comprises:
identifying the type of video frame the data packet corresponds to; and
classifying said data packet according to the identified type of video frame.

4. The method of claim 3, wherein:
said having a proxy server at said base station classify each data packet according to the type of video frame corresponding thereto is carried out by the proxy server, which is located at the application layer of the base station; and
the method further comprises having the proxy server deliver the classified data packets to the scheduler at the MAC layer of the base station.

5. The method of claim 3, wherein:
the classified data packets corresponding to a same video content are arranged in a corresponding transmission queue which is assigned to a corresponding radio bearer, the method further comprising:
having the scheduler divide radio bearers corresponding to different video contents into a first priority group and into a second priority group, wherein:
the first priority group comprises radio bearers whose corresponding transmission queues have a corresponding head of line data packet which is classified as corresponding to the Intra-coded picture frame type; and
the second priority group comprises the remaining radio bearers.

6. The method of claim 5, wherein:
said having the scheduler assign radio resources for the transmission of the data packets to the client based on the labels carried out by the proxy server comprises prioritizing the assignment of radio resources to radio bearers belonging to the first priority group.

7. A system, comprising:
a wireless communication network including at least one base station;
a content server configured to transmit video contents to a client through said base station, each video content comprising a sequence of encoded video frames, the content server being configured to send a video content in a sequence of data packets, each data packet comprising data corresponding to at least one portion of an encoded video frame, wherein:
a proxy server is provided at said base station to classify and label each data packet according to the type of video frame corresponding thereto, the proxy server extracting from each data packet information related to an encoding algorithm of the video frame corresponding thereto in order to determine the type of the video frame; and
a scheduler is further provided at said base station to assign radio resources for the transmission of the data packets to the client based on labels added to the data packets by the proxy server, the data packets being transmitted to the client by exploiting the radio resource assignment carried out by the scheduler.

8. The system of claim 7, wherein:
said type of video frame comprises: Intra-coded picture frame type, Predicted picture frame type, and Bi-predictive picture frame type; and
the scheduler is configured to prioritize the assignment of radio resources for the transmission of data packets which have been classified as corresponding to the Intra-coded picture frame type.

9. The system of claim 8, wherein said proxy server is further configured to:
identify the type of video frame to which the data packet corresponds, and
classify said data packet according to the identified type of video frame.

10. The system of claim 9, wherein:
the proxy server is at an application layer of the base station;
the scheduler is at a MAC layer of the base station; and
the proxy server is configured to deliver the classified data packets from the application layer of the base station to the scheduler at the MAC layer of the base station.

11. The system of claim 9, wherein:
the classified data packets corresponding to a same video content are arranged in a corresponding transmission queue which is assigned to a corresponding radio bearer; and
the scheduler is configured to divide radio bearers corresponding to different video contents into a first priority group and into a second priority group, wherein:
the first priority group comprises radio bearers whose corresponding transmission queues have a corresponding head of line data packet which is classified as corresponding to the Intra-coded picture frame type; and
the second priority group comprises the remaining radio bearers.

12. The system of claim 11, wherein the scheduler is configured to prioritize the assignment of radio resources to radio bearers belonging to the first priority group.

* * * * *